United States Patent [19]
Kramer et al.

[11] Patent Number: 5,580,597
[45] Date of Patent: Dec. 3, 1996

[54] PROCESS FOR COOKING MEAT PRODUCTS TO PRODUCE A SIMULATED NET SURFACE

[76] Inventors: Lee Kramer, 1948 Elm View, West Point, Miss. 39773; Roger S. Williams, 1777 Bethel N.R. Rd., New Richmond, Ohio 45242; Frank C. Mello, 46 W. Cottonwood La., Columbus, Miss. 39701; Jeffrey A. Williams, 495 Camelot Cir., N.W., Calhoun, Ga. 30701; Dale V. Miller, 11264 Ruralview Dr., Holland, Mich. 49424

[21] Appl. No.: 309,032

[22] Filed: Jan. 9, 1995

[51] Int. Cl.$^6$ .............................. A23L 1/31; A23L 1/317
[52] U.S. Cl. .................... 426/412; 426/413; 426/414; 426/513; 426/641
[58] Field of Search ..................... 426/129, 412, 426/413, 414, 513, 641, 132, 135

[56] References Cited

U.S. PATENT DOCUMENTS

| | | | |
|---|---|---|---|
| 3,178,910 | 4/1965 | Hammerle | 426/129 X |
| 4,606,922 | 8/1986 | Schirmer | 426/129 X |
| 4,820,536 | 4/1989 | Lippincott et al. | 426/412 |
| 4,879,124 | 11/1989 | Oberle | 426/129 X |
| 4,883,677 | 11/1989 | Aiga et al. | 426/420 |
| 5,147,671 | 9/1992 | Winkler | 426/641 X |

*Primary Examiner*—Arthur L. Corbin

[57] ABSTRACT

A method, and product formed thereby, for cooking meat products to produce an aesthetic surface and retain the natural juices wherein a heat shrinkable packaging material having a simulated net retaining surface appearance is formed around the meat product, and the package and meat product are cooked in a hot water bath to heat shrink the packaging material and create a three dimensional net surface design on the cooked meat product. The heat shrinkable material is thereafter removed, the meat product surface retains the netted surface design, and the meat product retains natural meat product juices.

4 Claims, 1 Drawing Sheet

PROCESS FOR COOKING MEAT PRODUCTS TO PRODUCE A SIMULATED NET SURFACE

BACKGROUND OF THE INVENTION

1. Field of the Invention

The present invention relates generally to a process for cooking meat products in packages and is particularly concerned with a process for cooking meat products to produce a simulated netted surface appearance and retain the natural juices of the meat products.

2. Description of the Prior Art

Heat cooking processes frequently use net or string materials of several types, styles and sizes to keep products in a form that can be easily stored, smoked and handled for consumption. This is a traditional means of display which today is more for aesthetic purposes since meat products usually use collagen or other edible membranes for cooking to prevent the net from adhering to the meat and marring the surface when it is removed.

The use of collagen or other edible membranes now involves shaping the contained meat product, be it emulsion and/or whole muscle, to hold the product in a generally redesigned shape during the cooking process.

While the membrane technique is quite satisfactory in permitting a thorough cooking of the product and causing it to retain a generally precooked shape, the net appearance is still desirable in many respects because of its traditional use for cooked meat products.

Various techniques are known for cooking pouch processes including that shown in U.S. Pat. No. 4,879,124 disclosing a slitted bag with the slits simulating the traditional net. The slits give some definition but do not really capture the appearance of traditional netting. Moreover, the slits do not permit the retention of juices within the package. Various other techniques are shown in U.S. Pat. Nos. 4,883,677; 4,942,809; and 4,606,922.

While there are processes being used that will provide simulated meat surfaces to some degree, no known process closely simulates the netting effect while at the same time retains the product juices within the cooked product. The present invention addresses this need.

OBJECTIVES AND SUMMARY OF THE INVENTION

It is an objective of the present invention to provide a process and product made thereby for cooking meat products to produce a simulated net retaining surface appearance while retaining the natural juices of the meat products.

Another objective of the present invention is to provide a process of the type described which will enable the sequential formation of packaged meat products having a simulated net retaining surface appearance.

Yet still another objective of the present invention is to provide a process of the type described that will retain the natural juices of the meat product after the package has been removed from the product.

Yet still a further objective of the present invention is to provide a process of the type described which forms a netted appearance on the meat product surface as the heat shrinkable predesigned material exerts a force and embosses the surface of the product.

The process for cooking meat products to produce a simulated net retaining surface appearance and retain the natural juices of the product comprises the steps of forming a cooking cavity from a heat shrinkable material, filling the formed cooking cavity with meat products, closing the product filled cavity with another heat shrinkable material, cooking the formed meat product package and product contained therein, and thereafter removing the package so that the three dimensional meat product surface is retained and the juices are contained within the finished product.

Other details of the process and product formed thereby and other objectives and advantages of the present invention will become more apparent after consideration of the following detailed description taken in conjunction with the accompanying drawings wherein like characters designate like parts throughout the several views.

BRIEF DESCRIPTION OF THE DRAWINGS

The invention will be better understood and objects other than those set forth above will become apparent when consideration is given to the following detailed description which makes reference to the annexed drawings where.

DETAILED DESCRIPTION OF THE PREFERRED EMBODIMENT

Figure 1:
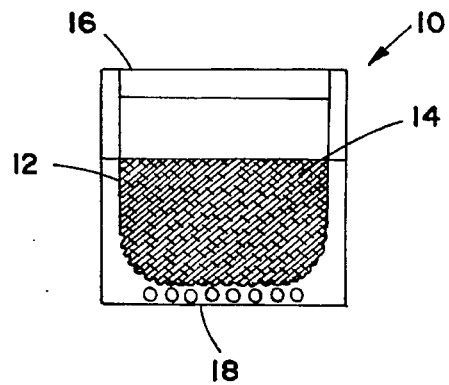
FIG. 1 is a side elevational schematic view of the die cavity having a simulated net refraining surface interior where a heat shrinkable material is positioned to form a cooking cavity having simulated net retaining surface appearance and which thereafter receives meat products for cooking.
Figure 2:
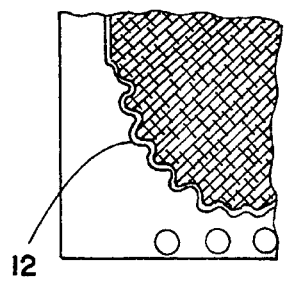
FIG. 2 is an enlarged fragmentary view of the die cavity and the heat sealable material shown in the encircled area of FIG. 1.

The present invention is intended to improve the appearance of meat products selectively formed in a predetermined configuration during the cooking process to retain the traditional netted appearance without actually using netting of any description. The process and product formed thereby of the present invention involves the use of a die cavity shown generally as 10 having a predesigned interior surface 12 magnified for clarity in FIG. 2 preferably configured to simulate a netted effect traditionally used with tightly bound meat products formed from whole muscle and emulsion. A heat shrinkable material which could include collagen or other edible membranes is positioned in the die cavity 10 to conform to the interior surface 12 and thereafter receives meat product 14 filled to a preselected level as shown. A piston 16 operates one or more times to firmly force meat product into the cavity so that it and the heat shrinkable material conform to surface 12 in the manner shown in FIG. 2. The mold may utilize heating elements 18 that induce a set to the material and meat product 14 positioned in the die cavity 10.

Figure 3:
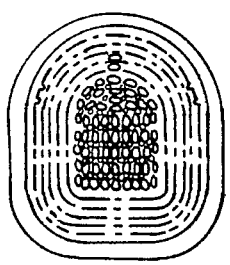
FIG. 3 is a plan view of the meat package formed by the process set forth herein.
Figure 4:
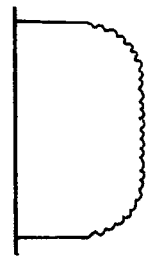
FIG. 4 is a side elevational and schematic view of the package shown in FIG. 3.
Figure 5:
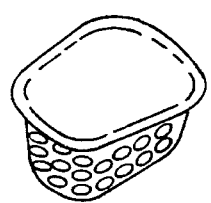
FIG. 5 is a perspective view of the package shown in FIGS. 3 and 4.

While the die cavity may have its interior surface 12 preferably designed to simulate a netted look, other designs are obviously acceptable and offer attractive alternatives. Such designs are reflected in the packages shown in FIGS. 3 and 5, and many alternatives are equally available.

Figure 6:
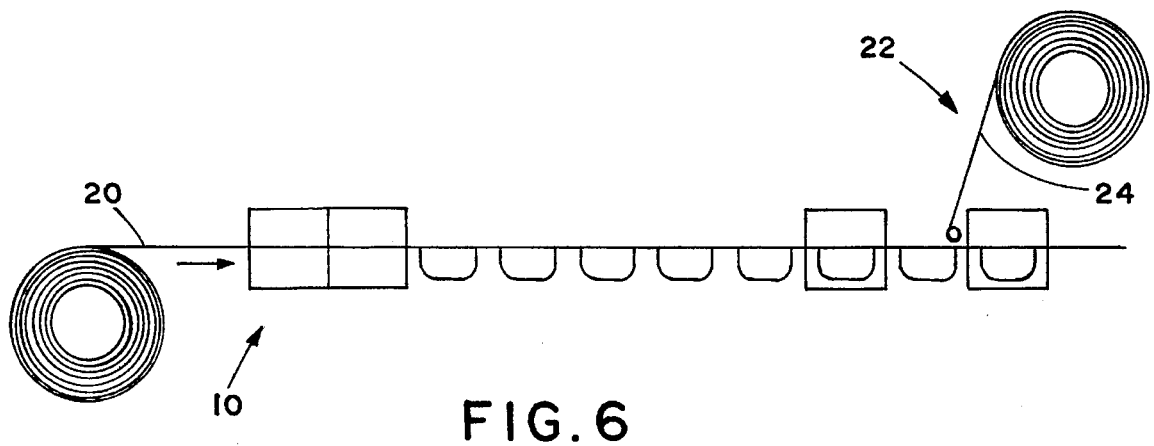
FIG. 6 is a side elevational schematic view of continuous sheets of heat shrinkable material being formed into packages by the process of the present invention.

The process comprising the present invention is best illustrated in the schematic diagram shown in FIG. 6 wherein a continuous sheet of heat shrinkable material 20 moves (see arrow) across die cavity 10 where it is preformed to conform with the cavity and thereafter filled with meat product 14 in the manner previously described. Sheet material 20 moves continuously and the formation of cooking cavities in the heat shrinkable material is sequentially accomplished at the forming station.

After the cooking cavity is filled with meat product, it moves to another station 22 where another continuous sheet of heat shrinkable material 24 is utilized to close the meat containing cavity and thereby form a complete meat package. Material 24 can also be heat set to adopt a netted or other design configuration or it can merely be sealed across the cavity opening without the formation of an aesthetic design therein.

The formed meat product packages are thereafter cooked in a hot water bath to heat shrink the heat shrinkable material and thereby emboss the three dimensional net design on the cooked meat product contained therein. Cooking meat can be sequentially done through a selective hot water bath or cooked in bulk as a plurality of finished packages are introduced into a large cooking bath. It has been found desirable to cook the finished meat packages in a hot water bath having a temperature within a range of from 155° Fahrenheit to 170° Fahrenheit.

The bath heat shrinks the encapsulating package material and thereby embosses the meat product surface with the design 12 of the meat cavity 10. Cooking the meat product in this manner also causes it to retain the natural meat product juices within the finished product for taste enhancement.

The cooked packages are subsequently removed from the hot water bath either sequentially or in bulk, and the heat shrinkable membrane forming the package is removed from the meat product. The design of the die cavity is retained in the surface of the meat product so that a cooked and formed three dimensional net design appears on the meat product surface and the natural meat product juices are retained therein.

The products resulting from the practice of the process comprising the present invention are uniquely configured to simulate traditional netted meat products that have great market attraction. The process is significantly effective in causing the retention of natural juices of meat products subjected thereto.

With respect to the present invention, it is to be understood that the techniques involved in practicing the process and forming the products of the convention set forth herein and the components associated therewith are unlimited and are deemed readily apparent and obvious to one skilled in the art. All equivalent relationships to those illustrated in the drawings and described in the specification intended to be encompassed herein.

The following is considered illustrative only of the principles of the invention. Since numerous modifications and changes will readily occur to those skilled in the art, the invention is not to be limited to the exact instruction and operation shown and described. All suitable modifications and equivalents that fall within the scope of the appended claims are deemed within the present inventive concept.

What is claimed is:

1. A process for cooking meat products to produce an aesthetic surface and retain natural juices comprising the steps of: forming a cooking cavity from a heat shrinkable material by positioning the material in a dye cavity having an interior with a three dimensional simulated net design; dispensing a meat product on the material in the formed cooking cavity and urging the meat product against the material and into the formed cooking cavity to fill the formed cooking cavity; closing the meat product containing cooking cavity with a heat shrinkable material; cooking the cavity-filled meat product in a hot water bath to heat shrink the cavity forming material and give the cooked meat product surface the simulated net design of the cooking cavity interior; and removing the heat shrunken material and retaining the simulated net design on the cooked meat product surface while retaining the natural meat product juices.

2. The process as claimed in claim 1 wherein the cavity filled meat product is cooked in a hot water bath having a temperature within the range of from 155° Fahrenheit to 170° Fahrenheit.

3. A process for cooking meat products to produce a simulated net retaining surface appearance and retain the natural juices of the meat products comprising the steps of: positioning a continuous sheet of heat shrinkable material in a plurality of die cavities, each having an interior with a three dimensional net design; forming a plurality of cooking cavities in the material by dispensing a meat product on the material in each formed cooking cavity and urging the meat product against the material and into each formed cooking cavity to cause the material to conform to each formed cooking cavity interior three dimensional net design; closing the meat product filled cooking cavities with another continuous sheet of shrinkable material to form a plurality of closed meat product packages; cooking each closed meat product package in a hot water bath to heat shrink the package and form the three dimensional net design on the cooked meat product; removing the package from each meat product and displaying the formed three dimensional net design on the cooked meat product surfaces while retaining the natural meat product juices.

4. The process as claimed in claim 3 wherein the hot water bath has a temperature within the range of 155° Fahrenheit to 170° Fahrenheit.

* * * * *